Patented Aug. 10, 1943

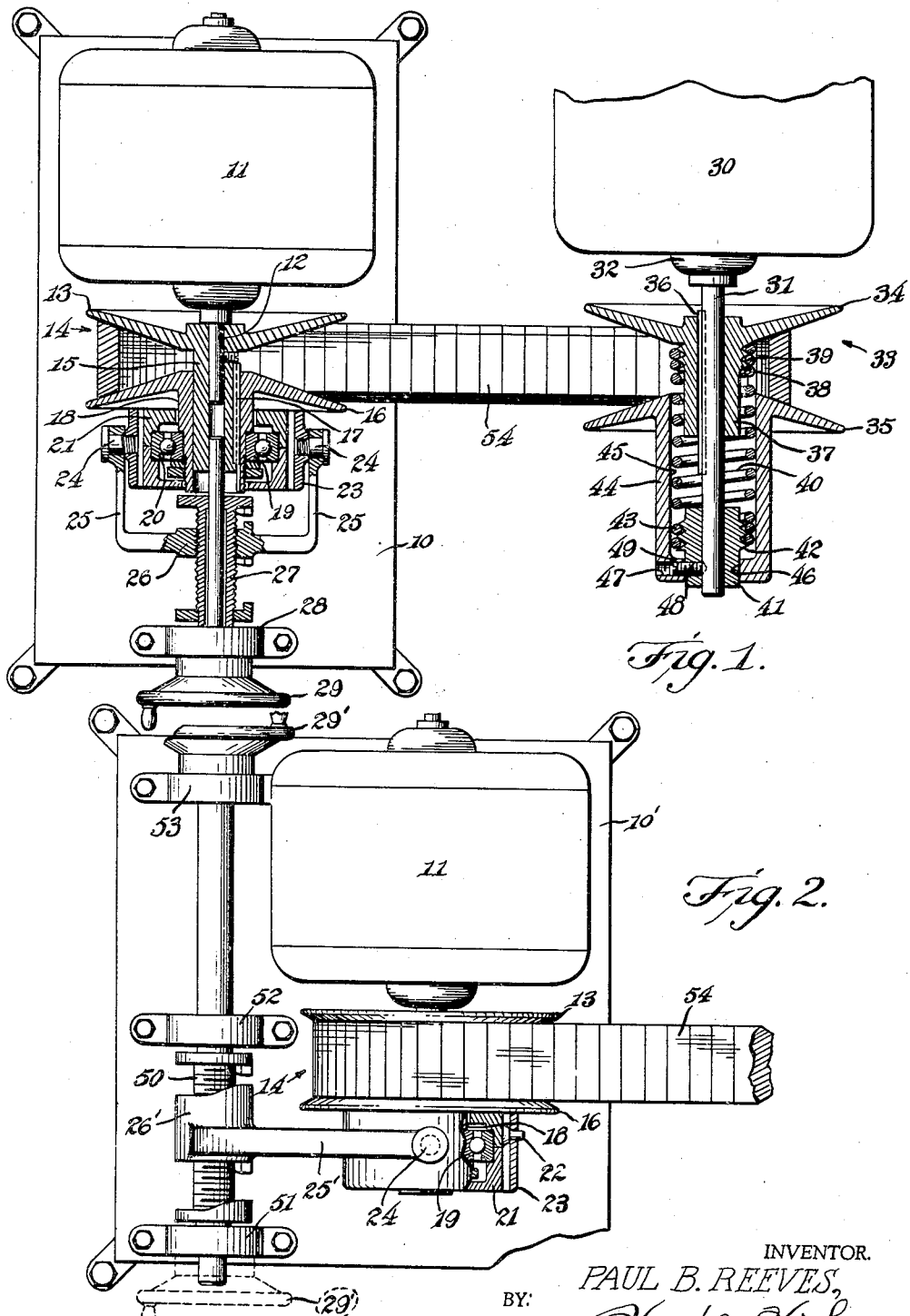

2,326,392

UNITED STATES PATENT OFFICE 2,326,392

VARIABLE SPEED UNIT AND PULLEY THEREFOR

Paul B. Reeves, Columbus, Ind., assignor to Reeves Pulley Company, Columbus, Ind., a corporation of Indiana Application March 12, 1942, Serial No. 434,373

12 Claims. (Cl. 74—230.17)

The present invention relates to a variable speed driving unit and a pulley therefor, and is particularly directed to that type of unit incorporating one or more variable-effective-diameter V-pulleys of the coned disc type, in which at least one of the variable pulleys is resiliently expansible. The particular problem to which this invention is primarily directed arises in connection with installations in which a resiliently expansible pulley is mounted upon, and to drive, the input shaft of a machine, which input shaft is supported solely by bearings in the machine frame, and the pulley being supported upon the outboard projection of such shaft. A primary object of the invention is to produce a pulley, one disc of which is fixed to the shaft, the other disc of which, being axially shiftable toward and away from the fixed disc, is interposed between the fixed disc and the supporting bearings for the shaft, and in which the median plane between the discs shall be as close as possible to the supporting bearing for the shaft.

In the prior art, resiliently expansible pulleys of the coned disc type have always been constructed generally in the manner illustrated, for instance, in my prior Patent No. 1,822,935, a compression type spring being interposed between the outer face of the shiftable disc and a suitable abutment on the shaft beyond such outer face of the shiftable disc. Such a construction is satisfactory in installations in which the fixed disc may be positioned between the shiftable disc and the bearing supporting the shaft upon the outboard projection of which the pulley is mounted. But in certain installations, it is not feasible so to arrange the fixed disc between the shiftable disc and such bearing.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a plan view of an installation constructed in accordance with the present invention; and Fig. 2 is a fragmentary plan of one end of a similar installation, illustrating a different type of shifting mechanism.

Upon a base 10 is mounted a motor 11 having a spindle 12 to which is fixed one coned disc 13 of an expansible pulley, indicated generally by the reference numeral 14. Said disc 13 is provided with an elongated hub 15 projecting from its coned face, and a mating disc 16 is splined on said hub 15 through the medium of a key 17, or the like. A hub 18 projects rearwardly from that face of said disc 16 opposite its coned face, and fixedly carries the inner race 19 of a thrust bearing, the outer race 20 of which fixedly supports a bearing housing 21. Said bearing housing 21 is provided with a pair of diametrically oppositely projecting pins 22 upon which is supported an equalizer ring 23. A pair of screws 24, each 90 degrees removed from the pins 22, secure to the equalizer ring 23 yoke arms 25 carried by a nut 26 threadedly mounted upon a screwshaft 27 which is rotatably, but non-reciprocably, supported in a bearing 28 carried by the base 10, a hand wheel 29 being suitably operatively associated with the screwshaft 27.

It will be obvious that, as the hand wheel 29 is rotated in one direction or the other, the nut 26 will be axially shifted in one direction or the other (non-illustrated means being provided for restraining the nut 26 against rotation) to shift the disc 16 positively toward or away from the disc 13.

An edge-active belt 54 is engaged between the coned faces of the discs 13 and 16, and will occupy variable radial positions between the discs 13 and 16, depending upon the relative positions of said discs, to vary the lineal speed of the belt 54 in response to a given angular velocity of the pulley 14.

Now, it will be obvious that, for optimum convenience of operation of the pulley 14, the shifting mechanism must be positioned adjacent that side of the pulley remote from the motor 11; and that, again for optimum convenience and simplicity of construction, this means that the shifting mechanism must act upon that disc of the pulley 14 which is remote from the motor 11. It is a feature of constructions of the type here under consideration that, as the shiftable disc is axially moved, the position of the median plane of the belt will shift axially. That is, if the disc 16 is moved away from the disc 13, the belt 54 will move inwardly across the faces of the discs 13 and 16; and, since the disc 13 is fixed, that movement of the belt will necessarily cause axial travel of the belt downwardly, as viewed in Fig. 1.

This means that, in installations of the kind here under consideration, it is essential that the fixed disc of the driven pulley must be axially offset and oppositely facing with respect to the fixed disc of the driving pulley in order to prevent misalignment of the belt as the pulleys are shifted. It follows that, if the shiftable disc of the driving pulley is to be the outer disc, then the fixed disc of the driven pulley must be the outer disc.

In Fig. 1 I have illustrated a machine indicated by the reference numeral 30, provided with an input shaft 31 which is supported in bearings, as 32, in the machine frame. The input pulley for the machine 30 must be supported upon the outboard projection of the shaft 31; and it is obviously desirable to avoid the necessity for providing an additional bearing at the outer end of the outboard projection of said shaft.

The pulley, indicated generally by the reference numeral 33, is the driven pulley referred to above. Its fixed disc must face oppositely with respect to the fixed disc 13 of the driving pulley 14. It follows that the shiftable disc must be interposed between the fixed disc and the bearing 32. If a construction like that illustrated in my prior Patent No. 1,822,935 were used, the spring 9 of that patent would have to be interposed between the pulley on the shaft projection 31 and the bearing 32, which would mean that the median plane of the driven pulley would have to be positioned far out beyond the bearing 32, so that the radial stresses resulting from the driving torque would be applied to the shaft projection 31 at a point far removed from the bearing 32, and there would be a certain amount of whip or vibration in the shaft projection which would have a deleterious effect not only upon the shaft itself but also upon the belt and the component parts of the transmission.

To overcome these difficulties, I have provided the peculiar construction illustrated in the present application. The pulley 33 comprises a shiftable disc 34 and a fixed disc 35. The shiftable disc 34 is splined to the shaft projection 31 through the medium of a key 36, or the like, and is provided with hub 37 projecting axially from its coned face, said hub being formed with an external thread 38. Two or three turns 39 at one end of a coiled spring 40 are threadedly engaged upon the thread 38 of the hub 37.

A hub element 41 is formed with an external thread 42; and two or three turns 43 at the opposite end of the spring 40 are threadedly engaged upon the thread 42 of the hub element 41. The spring 40 is so proportioned that, in its relaxed condition, the distance between the turns 39 and the turns 43 is less than the minimum distance between the thread 38 and the thread 42. Thus, even when the coned faces of the discs 34 and 35 are in contact with each other, the spring 40 will be under tension, and tending to contract still further.

The hub element 41 is sleeved upon the shaft 31 within a barrel 44 formed upon, and projecting coaxially rearwardly from, that face of the disc 35 remote from the disc 34, the interior 45 of said barrel opening coaxially through the coned face of the disc 35. The internal diameter of the barrel is sufficiently larger than the diameter of the hub 41 and the hub 37 to house the spring 40. At its extremity, the barrel 44 is formed with an opening 46 snugly sleeved upon the outer end of the hub element 41. A threaded bore 47 in the outer end of the barrel 44 may be registered with a threaded bore 48 in the hub element 41, for the conjoint reception of a set screw 49 which provides a rigid connection between the barrel 44 and the element 41, and which can be turned down into engagement with the shaft 31 to fix the element 41 and the barrel 44 to said shaft.

Thus the pulley 33 comprises a disc 35 fixed to the shaft 31, a disc 34 axially shiftable with respect to said disc 35, and a tension spring 40, positioned wholly on that side of the disc 34 remote from the bearing 32, but constantly urging the disc 34 away from the bearing 32 and toward the mating disc 35. And as a result of this construction, it is possible to position the shiftable disc 34 closely adjacent to the bearing 32, thereby locating the median plane between the discs (in which plane substantially the entire radial stress resulting from the driving effort is exerted against the shaft 31) very close to the bearing 32.

It will be clear from an inspection of Fig. 1 that, as the disc 16 is moved away from the disc 13, the resilient action of the spring 40 will cause the disc 34 to move toward the disc 35, thus squeezing the belt 54 outwardly between said discs and pulling the belt inwardly between the discs 13 and 16. Such radial movement of the belt between the discs 13 and 16 will, as above described, cause the median plane of the belt to shift downwardly as viewed in Fig. 1, as the belt travels over the coned face of the disc 13; but it will be perceived that that movement of the belt is accompanied by a corresponding movement of the opposite end of the belt across the coned face of the fixed disc 35, so that the two ends of the belt move downwardly to the same extent, whereby the median plane of the belt is held parallel to its illustrated position. Now, if the disc 34 were the fixed disc, it will be obvious that, as the left-hand end of the belt moves downwardly through traveling inwardly across the face of the disc 13, the right-hand end of the belt would move upwardly as a result of traveling outwardly across the face of the disc 34; and such movement would result in twisting of the belt which would greatly increase the wear upon the belt. It is for this reason that it is essential that the shiftable discs of the two pulleys shall be oppositely faced; and it is for this reason that it is essential to go to some such construction as that which I have illustrated in the present disclosure in order to attain the advantage of positioning the medium plane of the belt as close as possible to the bearing 32, while retaining the simplicity of construction of the shifting mechanism for the disc 16.

In Fig. 2 I have illustrated a different shifting mechanism. Upon the base 10' is mounted the same motor 11 carrying, on its spindle, the pulley 14 comprising the discs 13 and 16. The hub 18 of the disc 16 carries the bearing race 19, while the bearing race 20 is fixed in the bearing housing 21, on the pins 22 of which is mounted the equalizer ring 23. Screws 24 secure to the equalizer ring the arms 25' carried by the nut 26' which is threadedly mounted on a screwshaft 50 rotatably but non-reciprocably supported in bearings 51, 52, and 53 on the base 10'. A hand wheel 29' may, in this embodiment of the invention, be mounted upon either end of the screwshaft 50.

It will be obvious that the pulley 33 finds utility not only in the particular type of drive illustrated herein, but also in that type of drive in which one of the pulleys is of invariable diameter, and the speed variation is attained by varying the center distance between the belt-connected pulleys.

I claim as my invention:

1. In a variable-speed unit, a pair of substantially parallel shafts, a first coned disc fixed to one of said shafts, a second coned disc axially shiftably mating with said fixed disc, means for axially shifting said second disc, a third coned disc fixed to the other of said shafts and oppositely facing and axially offset with respect to said first disc, a fourth coned disc axially shiftably associated with said third disc, tension spring means urging said fourth disc toward said third disc, and an edge active belt providing a driving connection between said first and second discs and said third and fourth discs.

2. The combination with a driven machine having a frame and a shaft mounted in a bearing in said frame and projecting outward from said frame, of a first coned disc axially slidably supported on said shaft adjacent said bearing, a second coned disc fixed on said shaft in mating relation to said first disc and separated from said bearing by said first disc, a single coiled spring sleeved on said shaft and separated from said bearing by said first disc, said spring being constantly expanded beyond its condition of equilibrium, whereby said spring continuously tends to contract to urge said first disc toward said second disc, an edge active belt operatively engaged between said discs, power delivery means operatively engaging said belt to drive the same, and means for variably determining the radial position of said belt between said discs.

3. A speed varying pulley comprising a first coned disc and a second coned disc adapted to be mounted in facing coaxial relation with said first disc, said second disc being provided with a coaxial extension projecting rearwardly from, and opening through, its coned face, and a coiled spring nested in said extension and having one end secured therein, and means securing the opposite end of said spring to said first disc, the relaxed length of said spring being less than the minimum distance between its points of attachment to said extension and to said first disc.

4. A speed varying pulley comprising a first coned disc having a hub coaxially projecting from its coned face, a thread formed on said hub, a second coned disc adapted to be mounted in mating coaxial relation with said first disc, said second disc being provided with a coaxial extension projecting rearwardly from, and opening through, its coned face, a coaxial hub mounted adjacent the outer end of said extension and formed with a thread, and a coiled spring having at least one of its turns at one end threadedly secured on the thread of one of said hubs and at least one of its turns at its other end threadedly secured on the threads of the other of said hubs, the relaxed length of said spring being less than the minimum distance between said threads.

5. The combination with a shaft of a coned disc axially shiftably mounted on said shaft and having a coaxial hub projecting from its coned face, said hub being formed with a thread, a mating coned disc fixed on said shaft and provided with a coaxial extension projecting rearwardly from, and opening through, its coned face, threaded means fixedly associated with said extension adjacent the outer end thereof, and a coiled spring sleeved on said shaft within said extension, at least one of the turns of said spring adjacent one end thereof being threadedly secured on the thread of said hub and at least one of the turns of said spring adjacent the opposite end thereof being threadedly secured on said threaded means, the distance between said turns when said spring is relaxed being less than the minimum distance between the thread of said hub and said threaded means.

6. The combination with a shaft of a coned disc axially shiftably mounted on said shaft, a second coned disc arranged on said shaft in coaxial mating relation with said first disc, a coiled spring sleeved on said shaft, an element fixed to said shaft and positioned on that side of said second disc remote from said shiftable disc, said spring having one end fixed to said element and the other end fixed to said shiftable disc and urging the latter toward said second disc, and means holding said second disc against axial movement with respect to said shaft.

7. The combination with a shaft of a coned disc axially shiftably mounted on said shaft, a second coned disc arranged on said shaft in coaxial mating relation with said first disc, a coiled spring sleeved on said shaft, an element fixed to said shaft and positioned on that side of said second disc remote from said shiftable disc, said spring having one end fixed to said element and the other end fixed to said shiftable disc and urging the latter toward said second disc, and means removably securing said second disc to said element.

8. The combination with a shaft of a coned disc axially shiftably mounted on said shaft, a second coned disc mounted on said shaft in coaxial mating relation with said first disc, said second disc being provided with a coaxial barrel projecting rearwardly from that face of said second disc remote from said first disc, a coiled spring sleeved on said shaft and having one end secured to said first disc, the opposite end portion of said spring being received within said barrel, an element sleeved on said shaft within said barrel, the opposite end of said spring being secured to said element, and means removably securing said barrel and said element against movement axially of said shaft.

9. The combination with a shaft of a coned disc axially shiftably mounted on said shaft, a second coned disc mounted on said shaft in coaxial mating relation with said first disc, said second disc being provided with a coaxial barrel projecting rearwardly from that face of said second disc remote from said first disc, a coiled spring sleeved on said shaft and having one end secured to said first disc, the opposite end portion of said spring being received within said barrel, an element fixed on said shaft within said barrel, the opposite end of said spring being secured to said element, and means removably securing said barrel against movement relative to said element.

10. The combination with a shaft of a coned disc axially shiftably mounted on said shaft, a second coned disc mounted on said shaft in coaxial mating relation with said first disc, said second disc being provided with a coaxial barrel projecting rearwardly from that face of said second disc remote from said first disc, opening through the coned face of said second disc, and provided with a coaxial opening in its rearmost end, a coiled spring sleeved on said shaft and having one end secured to said first disc, the opposite end portion of said spring being received within said barrel, an element sleeved on said shaft within said barrel, the opposite end of said spring being secured to said element, said opening at the rearmost end of said barrel being sleeved over said element, and means removably securing said barrel and said element against movement relative to each other and to said shaft.

11. In a variable speed unit, a pair of substantially parallel shafts, a first coned disc fixed to one of said shafts, a second coned disc axially shiftably mating with said fixed disc, means for axially shifting said second disc, a third coned disc fixed to the other of said shafts and oppositely facing and axially offset with respect to said first disc, a fourth coned disc axially shiftably associated with said third disc, a single coiled spring sleeved on said other shaft and constantly expanded beyond its condition of equilibrium, said spring being operatively associated with said third and fourth discs, to urge said fourth disc constantly toward said third disc, and an edge active belt providing a driving connection between said first and second discs and said third and fourth discs.

12. In a variable speed unit, a pair of substantially parallel shafts, a variable diameter pulley drivingly supported from one of said shafts and comprising a pair of relatively axially shiftable facing coned discs cooperating to form a pulley of variable effective diameter, means for effecting relative axial movement of said discs, a second variable diameter pulley drivingly supported from one of said shafts and comprising a second pair of relatively axially shiftable facing coned discs cooperating to form a pulley of variable effective diameter, a single coiled spring sleeved on said other shaft, positioned between said last-mentioned discs, and constantly expanded beyond its condition of equilibrium, said spring being operatively associated with said last-named discs to urge said last-named discs toward each other, and an edge active belt providing a driving connection between said first and second pulleys.

PAUL B. REEVES.

CERTIFICATE OF CORRECTION.

Patent No. 2,326,392.  August 10, 1943.

PAUL B. REEVES.

It is hereby certified that error appears in the printed specification of the above numbered patent requiring correction as follows: Page 3, first column, line 18, claim 2, for "outward" read --outboard--; and that the said Letters Patent should be read with this correction therein that the same may conform to the record of the case in the Patent Office.

Signed and sealed this 14th day of September, A. D. 1943.

(Seal)
Henry Van Arsdale,
Acting Commissioner of Patents.